United States Patent
Mochizuki et al.

(10) Patent No.: US 9,916,221 B2
(45) Date of Patent: Mar. 13, 2018

(54) MANAGING LOGGER SOURCE CODE SEGMENTS

(71) Applicant: International Business Machines Corporation, Armonk, NY (US)

(72) Inventors: Tomoka Mochizuki, Koto-Ku (JP); Tomonori Sugiura, Yokohama (JP); Lianzi Wen, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/708,169

(22) Filed: Sep. 19, 2017

(65) Prior Publication Data

US 2018/0039562 A1  Feb. 8, 2018

Related U.S. Application Data

(63) Continuation of application No. 15/230,541, filed on Aug. 8, 2016.

(51) Int. Cl.
| | |
|---|---|
| *G06F 9/44* | (2006.01) |
| *G06Q 10/00* | (2012.01) |
| *G06F 11/36* | (2006.01) |
| *G06Q 10/06* | (2012.01) |

(52) U.S. Cl.
CPC ...... *G06F 11/3636* (2013.01); *G06F 11/3692* (2013.01)

(58) Field of Classification Search
CPC .. G06Q 10/06; G06F 8/70; G06F 8/20; G06F 11/3636; G06F 11/3692; G06F 11/3672; G06F 11/3664
See application file for complete search history.

(56) References Cited

U.S. PATENT DOCUMENTS

| | | | | |
|---|---|---|---|---|
| 8,122,425 | B2 * | 2/2012 | Corral | G06Q 10/06 705/7.17 |
| 8,650,539 | B2 * | 2/2014 | Gobel | G06F 8/70 717/120 |
| 8,782,598 | B2 * | 7/2014 | Chaar | G06F 8/00 717/106 |

(Continued)

FOREIGN PATENT DOCUMENTS

| | | |
|---|---|---|
| JP | 10021066 A | 1/1998 |
| JP | 2000057011 A | 2/2000 |

(Continued)

OTHER PUBLICATIONS

Yin et al., How do fixes become bugs?, Sep. 2011, 11 pages.*

(Continued)

*Primary Examiner* — Thuy Dao
(74) *Attorney, Agent, or Firm* — Edward J. Wixted, III

(57) ABSTRACT

A computer-implemented method includes identifying a primary code segment, determining a confidence score associated with said primary code segment, and determining whether the confidence score exceeds a confidence threshold. The computer-implemented method further includes responsive to the confidence score exceeding the confidence threshold, determining a logger code segment associated with the primary code segment. A corresponding computer program product and computer system are also disclosed.

1 Claim, 4 Drawing Sheets

(56) References Cited

U.S. PATENT DOCUMENTS

| | | | |
|---|---|---|---|
| 8,863,073 B2* | 10/2014 | Chaar | G06F 8/10 |
| | | | 717/101 |
| 9,020,939 B2 | 4/2015 | Brodsky et al. | |
| 9,286,191 B2 | 3/2016 | Carson et al. | |
| 2005/0138471 A1 | 6/2005 | Okbay et al. | |
| 2009/0037894 A1 | 2/2009 | Unger | |
| 2013/0047140 A1 | 2/2013 | Shann et al. | |
| 2015/0178182 A1* | 6/2015 | Mallya | G06F 11/3672 |
| | | | 717/124 |
| 2015/0261960 A1 | 9/2015 | Aad et al. | |
| 2015/0347212 A1 | 12/2015 | Bartley et al. | |
| 2015/0356293 A1 | 12/2015 | Biswas | |
| 2016/0055079 A1* | 2/2016 | Hanna | G06F 11/3692 |
| | | | 717/135 |

FOREIGN PATENT DOCUMENTS

| | | |
|---|---|---|
| JP | 2000187586 A | 7/2000 |
| JP | 5768448 B2 | 8/2015 |

OTHER PUBLICATIONS

L. Buglione, Light maturity models (LMM): an Agile application, Jun. 2011, 5 pages.*

Raatikainen et al., Architecture management and evaluation in mature products: experiences from a lightweight approach, Jul. 2014, 10 pages.*

Krogmann, Klaus, "Reconstruction of Software Component Architectures and Behaviour Models using Static and Dynamic Analysis", The Karlsruhe Series on Software Design and Quality, vol. 4, Chapter 5.10.6, Instrumentation, 6 pages, KIT Scientific Publishing 2012.

"Welcome to Log4j 2!", Logging Services™, 3 pages, printed on May 10, 2016, Copyright © 1999-2015 Apache Software Foundation<https://logging.apache.org/log4j/log4j-2.3/manual/index.html>.

Mochizuki et al., "Managing Logger Source Code Segments", U.S. Appl. No. 15/230,541, filed Aug. 8, 2016, 21 pages.

IBM, List of Patents Treated As Related, Appendix P, Filed Herewith, 2 pages.

* cited by examiner

MANAGING LOGGER SOURCE CODE SEGMENTS

BACKGROUND

The present invention relates generally to the field of source code development platforms, and more particularly to managing logger source code segments in such platforms.

In source code development platforms, logger source code segments can assist developers in testing the program under development and spotting errors in source code. Managing logger code segments is important to such platforms because unnecessary logger code segments have execution costs while failure to insert logger source code segments when needed can harm error detection. Developers and users of source code development platforms continue to face difficulties with managing logger source code segments in such platforms.

SUMMARY

A computer-implemented method includes identifying a primary code segment, determining a confidence score associated with said primary code segment, and determining whether the confidence score exceeds a confidence threshold. The computer-implemented method further includes responsive to the confidence score exceeding the confidence threshold, determining a logger code segment associated with the primary code segment. A corresponding computer program product and computer system are also disclosed.

DETAILED DESCRIPTION

Figure 1:
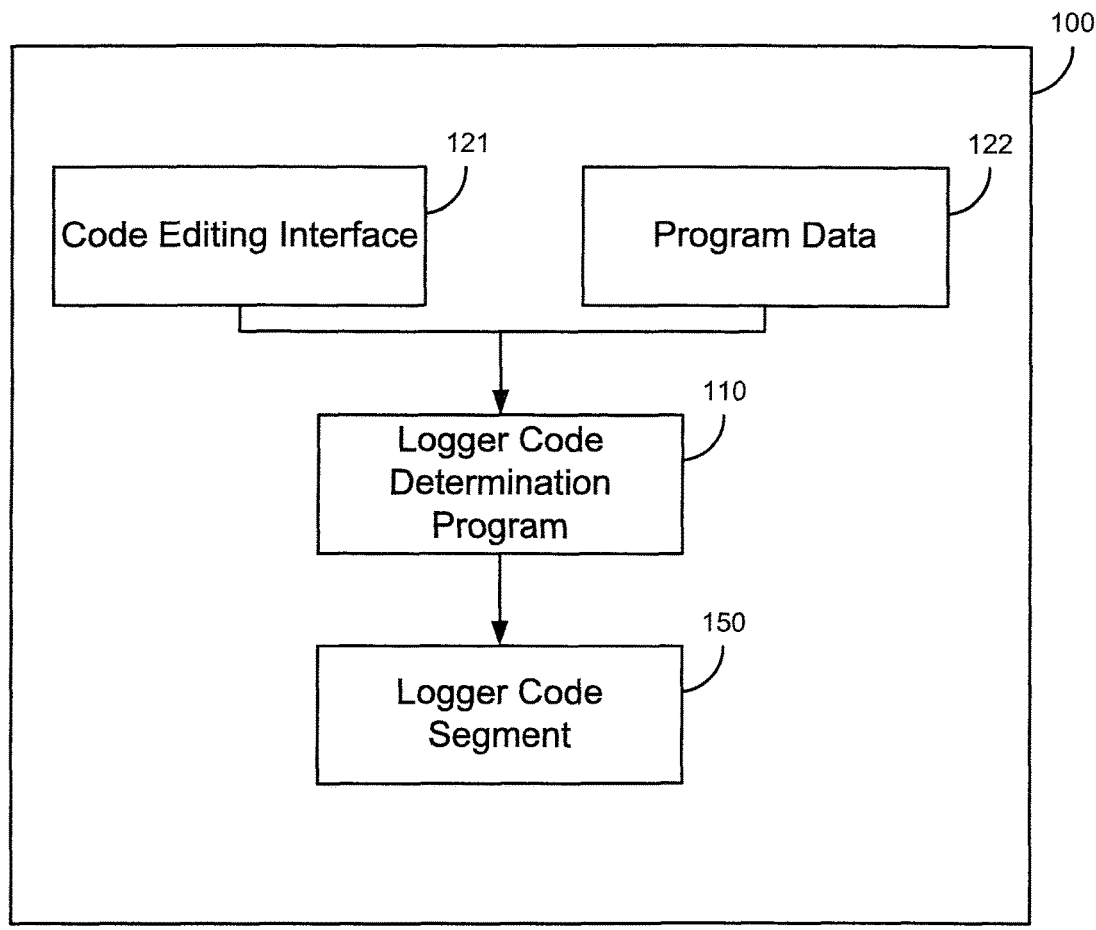
FIG. 1 is a block diagram of one embodiment of a computer system environment suitable for operation of a logger code determination program, in accordance with at least one embodiment of the present invention.

FIG. 1 is a block diagram of a computer system environment 100 suitable for operating a logger code determination program 110, in accordance with at least one embodiment of the present invention. In the computer system environment 100 depicted in FIG. 1, the program 110 receives information from a code editing interface 121 and from program data artefacts 122, and uses those information to determine logger code segments 150. In at least some embodiments, a code-editing interface 121 is any combination of one or more computer components that enable a user and/or an application to write, edit, and/or compile at least one line of computer program code. In some embodiments, the code-editing interface 121 is an integrated development environment (IDE). In at least some embodiments, program data 122 is any combination of one or more data artefacts that a user and/or an application provides to the logger code determination program 110 and that assists the program 110 in at least one step of its operation. In at least some embodiments, a logger code segment 150 is any code segment that performs at least one of the following: (1) returns and/or displays the value of a variable and/or a state of a computer program during at least one stage of the program execution; and (2) provides at least one information about the operation and/or execution of a computer program during at least one stage of the program execution. In some embodiments, a logger code segment determines, returns, and/or displays the value of a variable indicating the state of a computer program during at least one stage of the program execution. In some embodiments, a logger code segments determines, returns, and/or displays at least one value based on a test of a variable indicating the state of a computer program during at least one stage of the program execution. In at least some embodiments, a code segment is a combination of one or more computer program code statements, literals, and/or variables.

Figure 2:
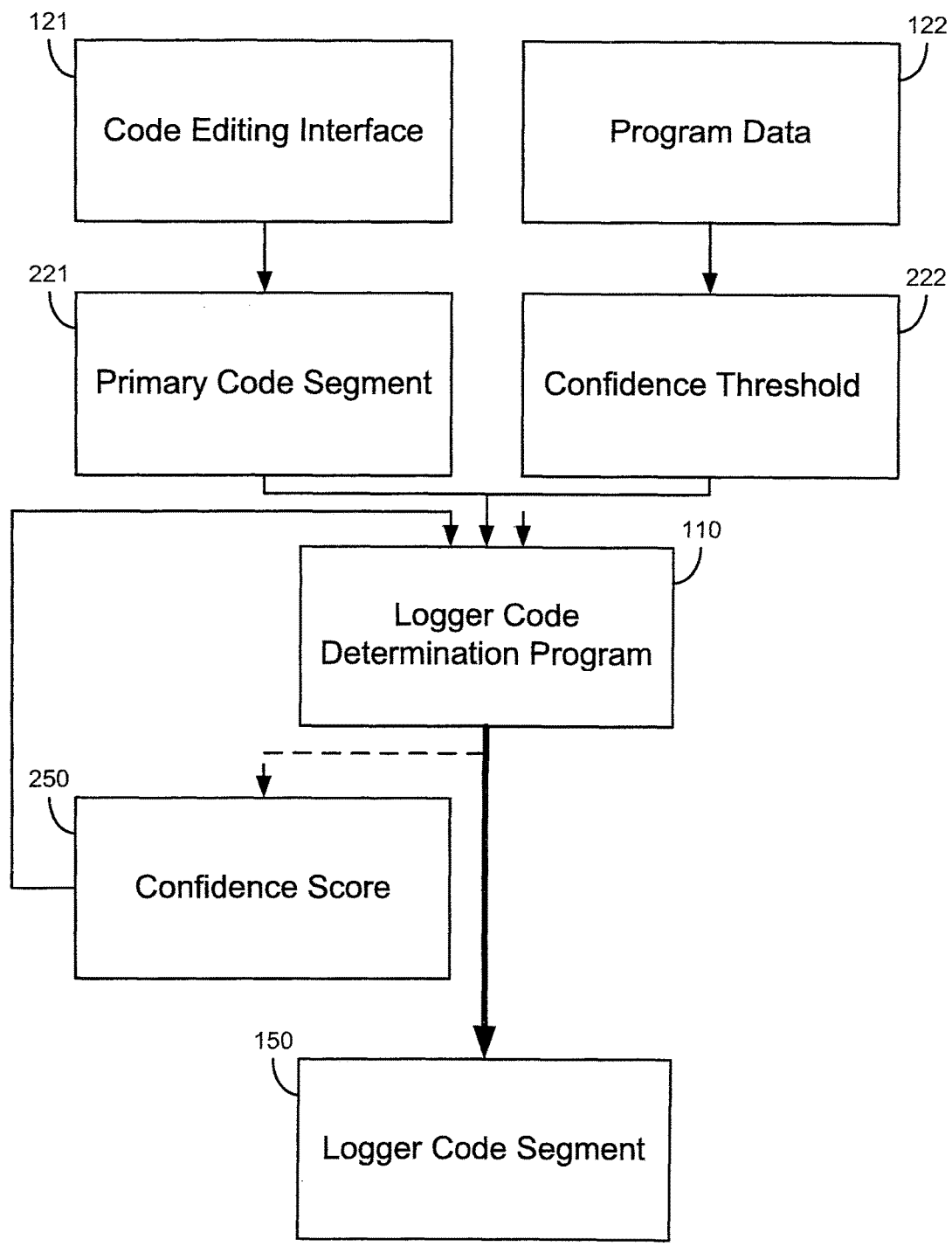
FIG. 2 is a data flow diagram of a logger code determination program, in accordance with at least one embodiment of the present invention.

FIG. 2 is a data-flow diagram of a logger code determination program 110, in accordance with at least one embodiment of the present invention. In the embodiment depicted in FIG. 2, the program 110 determines the primary code segment 221 based on the information provided by the code editing interface 121 and determines a confidence score 250 associated with the primary code segment 221. In at least some embodiments, a primary code segment 221 is a code segment with respect to which the logger code determination program 110 determines at least one of the following: (i) whether to determine a logger code segment 150; and (ii) a particular logger code segment 150. In at least some embodiments, a confidence score 250 associated with the primary code segment 221 is an indication of lack of confidence in and/or unreliability of the primary code segment 221 (e.g., derived from one or more properties associated with the primary code segment 221, including a user and/or application input about the level of confidence in the primary code segment 221).

In the embodiment depicted in FIG. 2, the logger code determination program 110 determines a confidence threshold 222 based on the program data 122. In at least some embodiments, a confidence threshold is a combination of one or more data artefacts that indicates when the value of confidence score 250 associated with the primary code segment 221 is high enough to cause the determination of the logger code segment 150. In the embodiment depicted in FIG. 2, the program 110 determines the logger code segments 150 associated with the primary code segment 221 based on confidence threshold 222 and the confidence score 250 associated with the primary code segment 221. In some embodiments, the program 110 determines one or more logger code segments 150 if the confidence score 250 associated with the primary code segment 221 exceeds the confidence threshold 222.

Figure 3:
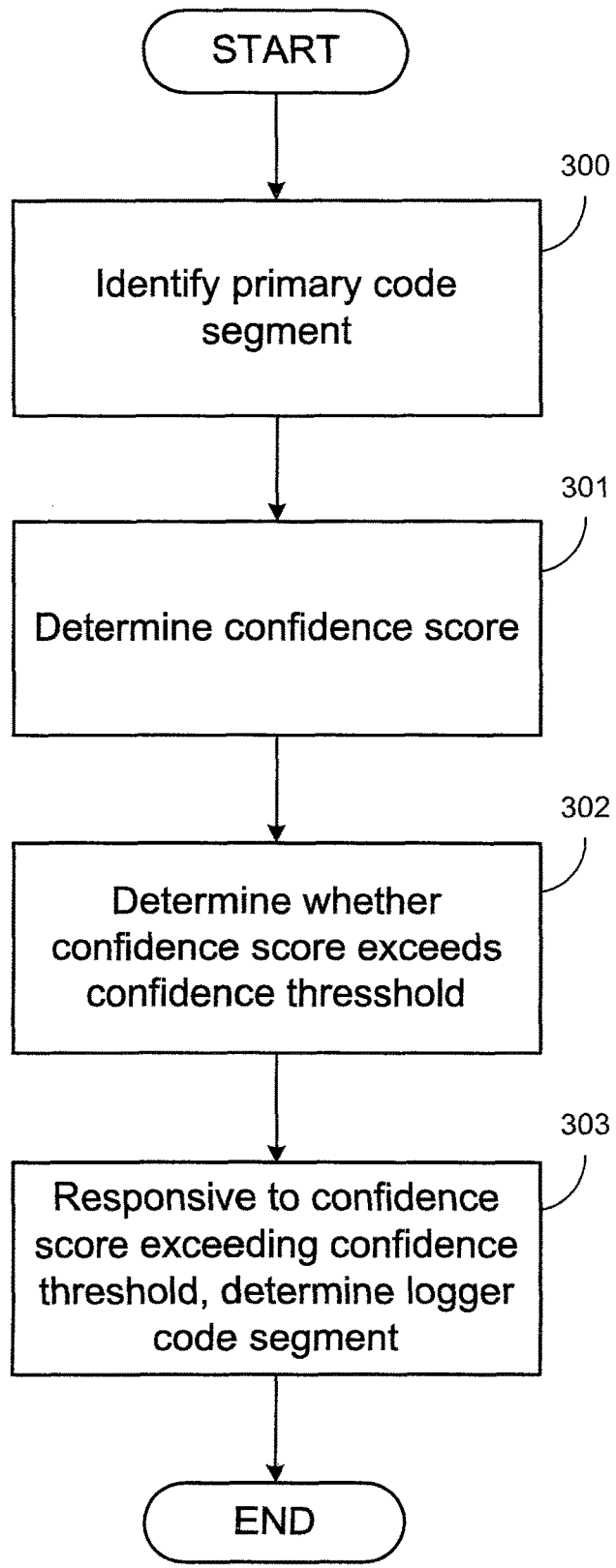
FIG. 3 is a flowchart diagram of a logger code determination program, in accordance with at least one embodiment of the present invention.

FIG. 3 is a flow-chart diagram of a logger code determination program, in accordance with at least one embodiment of the present invention. At step 300, the program identifies a primary code segment. At step 301, the program determines a confidence score associated with the primary code segment. At step 302, the program determines whether a confidence score exceeds a confidence threshold. At step 303, responsive to the confidence score exceeding the confidence threshold, the program determines a logger code segment associated with the primary code segment.

In some embodiments, the logger code determination program further comprises determining a use frequency indicator associated with the primary code segment, determining a modification frequency indicator associated with the primary code segment, determining a use frequency indicator being associated with the primary code segment, and determining a failure response indicator associated with the primary code segment. In at least some of those embodiments, determining the confidence score is performed based on at least one of the use frequency indicator, the modification frequency indicator, the user confidence indicator, and the failure response indicator. In some embodiments, the confidence is determined based on an addition of the use frequency indicator, the modification frequency indicator, and the user confidence indicator. In some embodiments, the confidence score is determined based on a weighed sum of the use the use frequency indicator, the modification frequency indicator, the user confidence indicator, and the failure response indicator, where each of the use frequency indicator, the modification frequency indicator, the user confidence indicator, and the failure response indicator is associated with a weight value. In some embodiments, the confidence score is determined based on a statistical measure (e.g., mean) of at least one of the use frequency indicator, the modification frequency indicator, the user confidence indicator, and the failure response indicator.

In at least some embodiments, the use frequency indicator associated with the primary code segment is any indication of how many times the primary code segment has been called and/or referenced by at least one code segment, computer application, and/or user command within at least one execution flow and/or time period (e.g., an indication of how many times a method or function has been called within its namespace code segment). In at least some embodiments, the modification frequency indicator associated with the primary code segment is any indication of how many times the primary code segment has been modified (either directly, through modification of another code segment that the primary segment calls and/or references, or both) within at least one execution flow and/or time period. In at least some embodiments, a user confidence indicator associated with the primary code segment is any user-supplied and/or application-supplied indication of confidence in the primary code segment within at least one time period. In at least some embodiments, the failure response indicator associated with the primary code segment is an indication of a determination and/or estimation about whether the at least part of the primary code segment has been inserted in response to a determined and/or response code execution failure (e.g., bug, segmentation error, or other exception). In some embodiments, the logger code determination program only determines a logger source code associated with a primary code segment when the primary code segment has been inserted in response to a source code execution failure (e.g., a logger is inserted for a method that has been modified in the course of the response to any failure that occurred).

In some embodiments, the logger code determination program determines a call frequency indicator associated with a primary code segment and a change frequency indicator associated with the primary code segment. In at least some of those embodiments, determining the use frequency indicator is performed based on the call frequency indicator and determining the modification frequency indicator is performed based on the change frequency indicator. In at least some embodiments, a call frequency indicator is an indication of how many times a function, method, and/or subroutine has been called within at least one execution flow and/or time period. In at least some embodiments, a change frequency indicator is an indication of how many times a code segment has been modified within at least one execution flow and/or time period.

In some embodiments, the logger code determination program further comprises identifying a normalization guideline. In at least some of those embodiments, the use frequency indicator, the modification frequency indicator, and the user confidence indicator are each determined based on the normalization guideline. In at least some embodiments, a normalization guideline comprises one or more instructions about how one or more values should be modified (e.g., to reflect a meaningful proportionality with one another).

In some embodiments, the logger code determination program further comprises determining a stability indicator associated with the primary code segment and determining whether to remove the logger code segment based on the stability indicator. In some embodiments, the program further comprises determining a change history indicator associated with the primary code segment and determining an error history indicator associated with the primary code segment. In at least some of those embodiment, determining the stability indicator is performed based on at least one of the change history indicator and the error history indicator.

In at least some embodiments, a stability indicator associated with the primary code segment is any indication of how stable the primary code segment is determined and/or estimated to be. In at least some embodiments, the change history indicator associated with the primary code segment is any indication of how many times the primary code segment has been modified (either directly, through modification of another code segment that the primary segment calls and/or references, or both) within at least one execution flow and/or time period. In some embodiments, the stability indicator associated with the primary code segment is the modification frequency indicator associated with the primary code segment used to determine the confidence score, while in other embodiments the two values may indicate the quantity of modification with respect to different execution flows and/or time periods. In at least some embodiments, an error history indicator associated with a primary code segment is any indication of how many errors (e.g., associated with a particular failure response) occurred within at least one execution flow and/or time period, where the errors were determined and/or estimated to be at least in part rooted in the primary code segment. In some embodiments, the logger code determination program determines whether to insert a logger code segment based on at least one of the use frequency indicator, the modification frequency indicator, the user confidence indicator, and the failure response indicator. In some embodiments, at least one of the use frequency indicator, the modification frequency indicator, the user confidence indicator, and the failure response indicator associated with the primary code segment is determined as a relative value in relation to use frequency, modification frequency, use frequency, and failure response of one or more other code segments (such as one or more code segments within the namespace of the primary code segment).

Embodiments of the present invention enable insertion and removal of logger code segments based on dynamically determined properties of the source code file. As such, embodiments of the present invention enable insertion and removal of logger code segments without the need for excessive user intervention and/or execution inefficiencies associated with user-managed logger code insertion and deletion. Nevertheless, the aforementioned advantages are not required to be present in all of the embodiments of the invention and may not be present in all of the embodiments of the invention.

Figure 4:
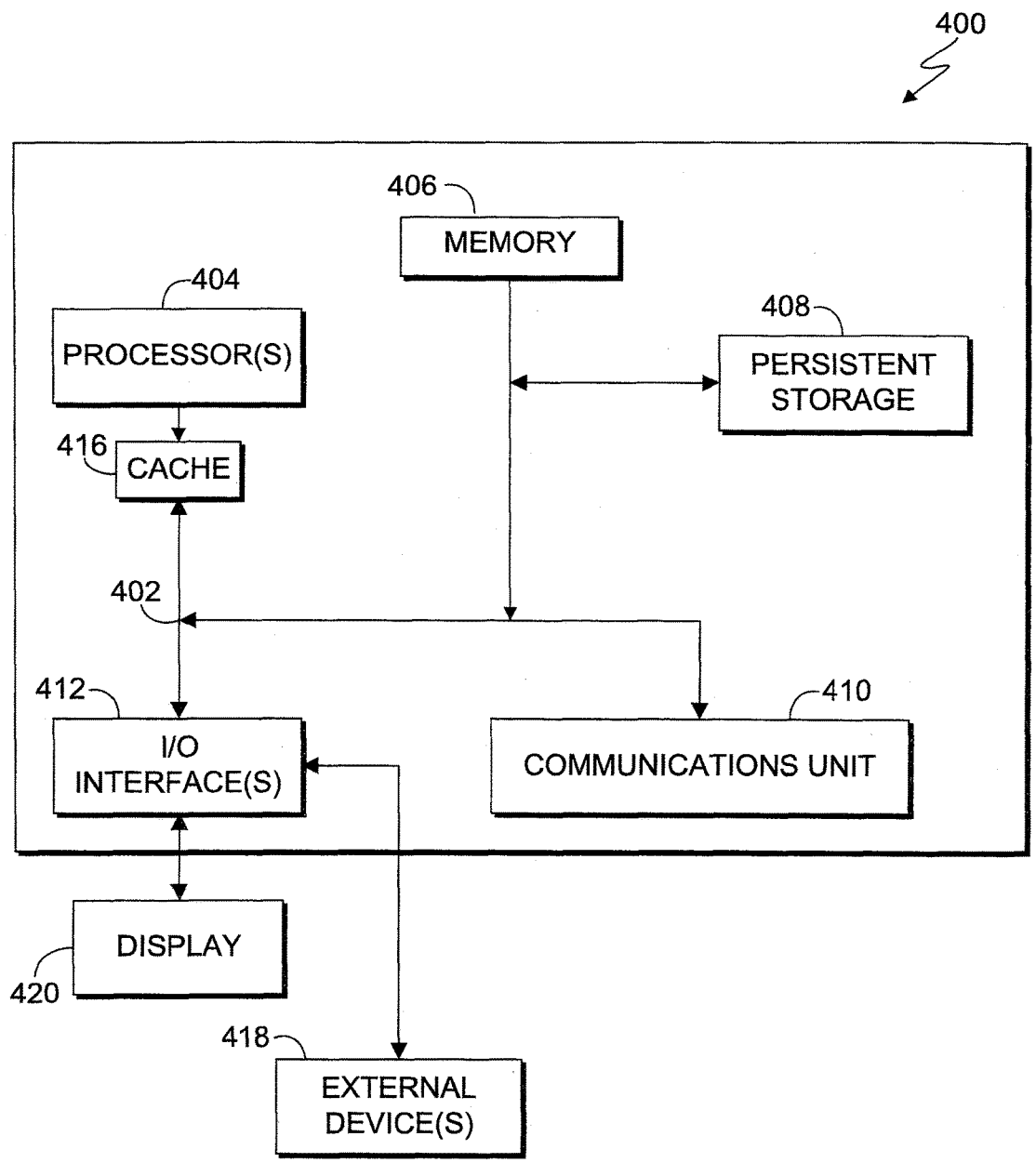
FIG. 4 is a block diagram of a computing apparatus suitable for executing a logger code determination program, in accordance with at least one embodiment of the present invention.

FIG. 4 is a block diagram depicting components of a computer 400 suitable for executing the logger code determination program. FIG. 4 displays the computer 400, the one or more processor(s) 404 (including one or more computer processors), the communications fabric 402, the memory 406, the RAM, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the logger code determination program may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The logger code determination program may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a primary code segment;
   determining a call frequency indicator, said call frequency indicator being associated with said primary code segment;
   determining a change frequency indicator, said change frequency indicator being associated with said primary code segment;
   identifying a normalization guideline;
   determining a use frequency indicator, said use frequency indicator being associated with said primary code segment, wherein determining said use frequency indicator is performed based on said call frequency indicator and said normalization guideline;
   determining a modification frequency indicator, said modification frequency indicator being associated with said primary code segment, wherein determining said modification frequency indicator is performed based on said change frequency indicator and said normalization guide;
   determining a user confidence indicator, said user confidence indicator being associated with said primary code segment, wherein determining said user confidence indicator is performed based on said normalization guideline;
   determining a failure response indicator, said user confidence indicator being associated with said primary code segment;
   determining a confidence score, said confidence score being associated with said primary code segment, wherein determining said confidence score is performed based on an addition of said use frequency indicator, said modification frequency indicator, said user confidence indicator, and said failure response indicator;
   determining whether said confidence score exceeds a confidence threshold;
   responsive to said confidence score exceeding said confidence threshold, determining a logger code segment, said logger code segment being associated with said primary code segment;
   determining a change history indicator, said change history indicator being associated with said primary code segment;

determining an error history indicator, said error history indicator being associated with said primary code segment;

determining a stability indicator, said stability indicator associated with said primary code segment, wherein determining said stability indicator is performed based on said change history indicator and said error history indicator; and determining whether to remove said logger code segment based on said stability indicator.

\* \* \* \* \*